United States Patent [19]

Basiulis et al.

[11] Patent Number: 4,757,688
[45] Date of Patent: Jul. 19, 1988

[54] SOLID-STATE ELECTROCALORIC COOLING SYSTEM AND METHOD

[75] Inventors: Al Basiulis, Redondo Beach; Robert L. Berry, Rancho Palos Verdes, both of Calif.

[73] Assignee: Hughes Aircraft Company, Los Angeles, Calif.

[21] Appl. No.: 846,764

[22] Filed: Apr. 1, 1986

[51] Int. Cl.[4] .............................................. F25B 21/00
[52] U.S. Cl. ........................................ 62/3; 62/333; 62/335; 165/32
[58] Field of Search ............... 62/3, 335, 333; 165/32, 165/96

[56] References Cited

U.S. PATENT DOCUMENTS

| | | | |
|---|---|---|---|
| 2,913,881 | 11/1959 | Garwin | 165/96 |
| 3,119,236 | 1/1964 | Lutes | 165/96 |
| 3,841,107 | 10/1974 | Clark | 165/96 |
| 4,136,525 | 1/1979 | Vechten | 62/3 |
| 4,464,903 | 8/1984 | Nakagome et al. | 62/3 |
| 4,509,334 | 4/1985 | Nakagome et al. | 62/3 |

*Primary Examiner*—Albert W. Davis, Jr.
*Attorney, Agent, or Firm*—Terje Gudmestad; Paul M. Coble; A. W. Karambelas

[57] ABSTRACT

A solid-state system and method for extracting heat from a given load which includes connecting a first diode heat pipe between an electrocaloric heating and cooling element and a load and a second diode heat pipe between the electrocaloric heating and cooling element and a heat sink. By appropriately pulsing the electrocaloric element to provide continuous heating and cooling thereof, heat may be continuously extracted from the load and through the two diode heat pipes to a heat sink.

4 Claims, 3 Drawing Sheets

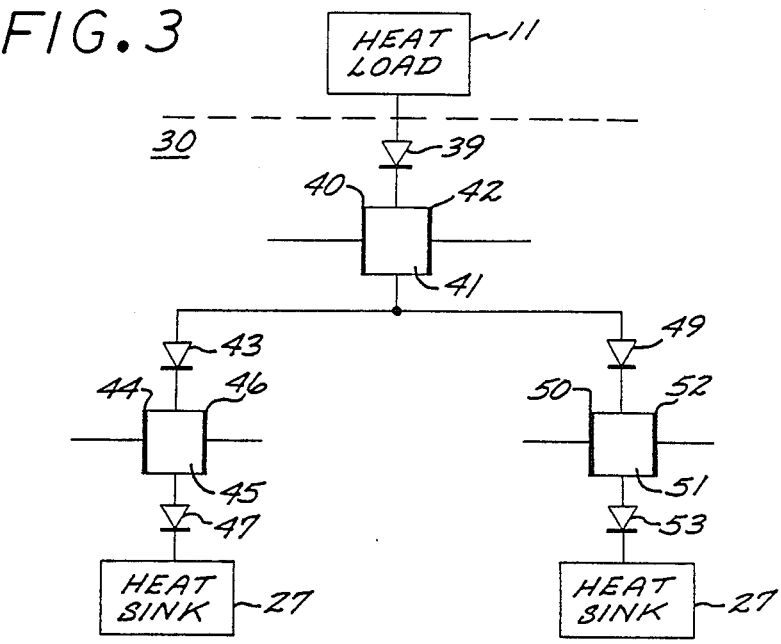
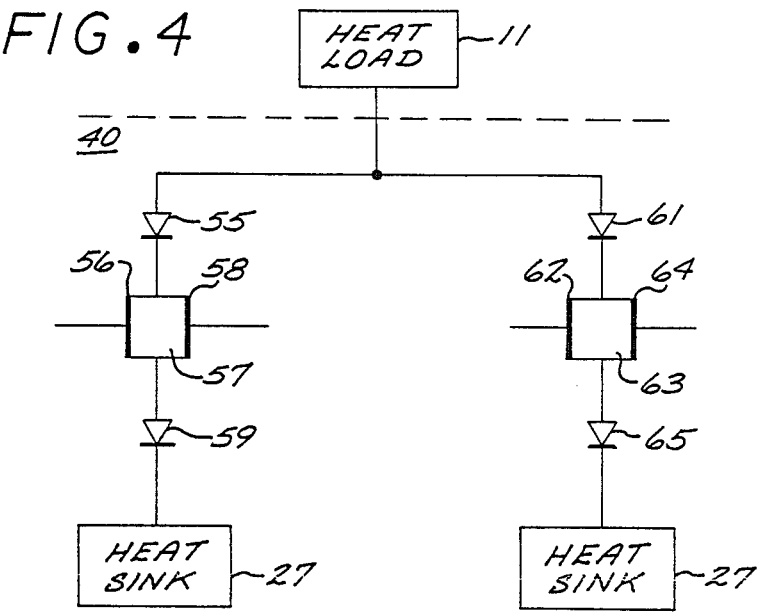

SOLID-STATE ELECTROCALORIC COOLING SYSTEM AND METHOD

BACKGROUND OF THE INVENTION

This invention generally relates to cryogenic cooling and more particularly to an electrocaloric refrigeration system with passive heat rejection.

It is well known that, for optimum performance, certain types of electronic detectors and devices must be cooled to cryogenic temperatures. For example, many semiconductor detectors such as mercury cadmium telluride (HgCdTe) infrared detector arrays used in military and space applications are typically cooled to cryogenic temperatures on the order of 80° K.

Known cryogenic cooling systems used for cryogenic cooling purposes are either mechanical or electromechanical in nature and require mechanical switches, pumped loops with switching circuits, or magnetically activated switches, or combinations thereof. These mechanical devices tended to make these prior art cooling systems complicated in construction and often unreliable (because of mechanical failure) in operation.

SUMMARY OF THE INVENTION

The general purpose of this invention is to provide a new and improved cooling system and method which is not so complicated and unreliable. These improvements are achieved by the utilization of an all solid-state electrocaloric cooling system which features passive heat rejection between, for example, an infrared detector load and a heat sink. In this system we provide an electrocaloric heating and cooling element responsive to a predetermined applied voltage to heat up to a high temperature and is further responsive to the removal of the applied voltage to cool down to a predetermined low temperature. A first unidirectional heat conductive element is connected between the electrocaloric element and a chosen heat sink and conducts heat from the electrocaloric element to the heat sink when the temperature of the electrocaloric element is greater than that of the heat sink. Additionally, a second unidirectional heat conductive element is connected between the electrocaloric element and the load to be cooled and conducts heat from the load to the electrocaloric element when the voltage on the electrocaloric element is removed and the electrocaloric element cools down to a temperature lower than the temperature of the load. In this manner, the electrocaloric element may be controllably pulsed with a predetermined applied voltage to produce a cyclic heat transfer between the load and the heat sink, and operates totally free of any mechanical or moving parts.

BRIEF DESCRIPTION OF THE DRAWING

The advantages and features of the disclosed invention will readily be appreciated by persons skilled in the art from the following detailed description when read in conjunction with the drawing wherein:

FIGS. 2 through 5 are schematic diagrams illustrating further embodiments of the all solid-state cooling system and method of the present invention.

DETAILED DESCRIPTION

Figure 1:
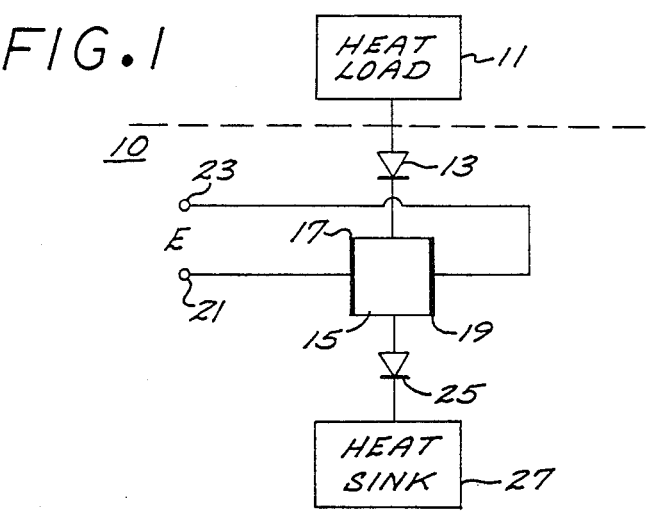
FIG. 1 is a schematic diagram illustrating the all solid-state cooling system and method according to the present invention.

In the following detailed description and in the several figures of the drawing, like elements are identified with like reference numerals.

Referring now to FIG. 1, shown therein is an electrocaloric cooling system 10 for cooling a heat load 11, which by way of example may be a cryogenic housing for an array of solid-state infrared detectors. The heat load 11 is thermally coupled by a unidirectional heat conductive element 13 to an electrocaloric cooling element 15. By way of example, the unidirectional heat conductive element 13 may be a unidirectional heat pipe or a diode heat pipe and is schematically shown with the electronic symbol for a diode. As discussed further herein in conjunction with the other elements of the cooling system 10, the unidirectional heat conductive element 13 has an appropriate working temperature range.

For ease of reference, unidirectional heat conductive elements will be referred to herein as unidirectional heat pipes or diode heat pipes. However, it should be readily understood that the unidirectional heat conductive elements disclosed herein are not limited to such structures.

The electrocaloric cooling element 15 is made of a solid crystal structure having an appropriate temperature working range of 80° K. to 160° K. A pair of electrodes 17 and 19 disposed on opposite surfaces of the electrocaloric element 15 are respectively coupled to input terminals 21 and 23 which receive a predetermined voltage E. Pursuant to application of the predetermined voltage E at the input terminals 21, 23, an electric field is generated between the electrodes 17, 19.

For ease of reference, the application of a voltage to the electrodes disposed on an electrocaloric element to provide an electric field across such electrodes shall be referred to as the application of an electric field to the electrocaloric element. Similarly, removal of the voltage shall cause removal of the applied electric field. As discussed more fully herein, the applied voltage may be pulsed, in which case the electrocaloric element shall be referred to as being pulsed.

As is well known, electrocaloric elements exhibit a reversible temperature change in response to application of an electric field. Thus, the electrocaloric element 15 will heat up to a high temperature pursuant to application of an electric field between the electrodes 17 and 19. This heat is then rejected to the heat sink 27 so that the temperature of the electrocaloric element 15 approaches its original temperature while subjected to the electric field. After the removal of the applied voltage E and the electric field across the element 15, the electrocaloric element 15 will cool down to a temperature which is lower than the temperature it had prior to receiving the applied voltage E.

Another unidirectional heat pipe 25 is thermally coupled between the electrocaloric element 15 and a heat sink 27. By way of example, the heat sink 27 may be an air cooled heat exchanger. The unidirectional heat pipe 25 has a higher working temperature range than the unidirectional heat pipe 13.

When the electrocaloric cooling element 15 receives the electric field pursuant an applied voltage E and is heated to a temperature above that of the heat sink 27, the unidirectional heat pipe 25 is biased to thermally conduct heat from the electrocaloric element 15 to the heat sink 27. Pursuant to such thermal conduction, heat is extracted from the electrocaloric element 15.

When the applied voltage E is removed from the electrocaloric cooling element 15, the element 15 cools down to a lower temperature. When the temperature of the electrocaloric cooling element 15 falls below the temperature of the heat load 11, the unidirectional heat pipe 13 becomes forward biased and thermally conducts heat from the heat load 11 to the electrocaloric element 15. Pursuant to such thermal conduction, heat is extracted from the heat load 11 and the heat load 11 is thereby cooled.

By pulsing the electrocaloric element 15 with the application at the terminals 21, 23 of a pulsed input voltage E having a predetermined duty cycle, the electrocaloric cooling element 15 is repeatedly heated and cooled. Such repeated heating and cooling functions to conduct heat from the heat load 11 to the heat sink 27 as follows.

Pursuant to heating of the electrocaloric element 15 by application of the voltage E across the terminals 21, 23, heat is conducted from the electrocaloric element 15 to the heat sink 27 by the forward thermal conduction of the unidirectional heat pipe 25 while the temperature of the heat sink 27 is below that of the electrocaloric element 15. Pursuant to cooling of the electrocaloric element 15 after removal of the voltage E, heat is conducted from the heat load 11 to the electrocaloric element 15 by the forward thermal conduction of the unidirectional heat pipe 13 while the temperature of the electrocaloric element 15 is below that of the heat load 11.

Considered another way, the electrocaloric element 19 may function as a heat source when it is subjected an electric field, and it may function as a heat sink after removal of the electric field. As a result of controlling the temperature of the electrocaloric element 15, its heat source or heat sink function is controlled, and heat transfer is achieved as previously described.

It should be readily understood that, as briefly mentioned above, the unidirectional heat pipes 13, 25 and the electrocaloric element 15 must have appropriate working temperature ranges for the temperature range of the heat load 11 and the desired cooling. Thus, the electrocaloric element 15 should be capable of being heated by an electric field to a temperature greater than the maximum temperature of the heat load, and it should be capable of cooling upon removal of the electric field to a temperature that is somewhat lower than the desired temperature for the heat load 11.

For example, the unidirectional heat pipe 13 may utilize nitrogen as a cryogenic working fluid for use at an operating temperature of 80° K. The electrocaloric element 15 may be of an appropriate material such as barium strontium titanate $[(Ba_xSr_{1-x})TiO_3]$ or cadmium lead niobate $[(Cd_xPb_{1-x})Nb_2O_7]$ for use at an operating temperature of 80° K. The unidirectional heat pipe 25 may utilize nitrogen as a cryogenic working fluid for use at an operating temperature of 100° K.

For reference, the cooling system 10 of FIG. 1 may be referred to as a single stage system since it includes only one heat transfer stage between the heat load 11 and the heat sink 27.

The referenced electrocaloric materials of barium strontium titanate (BST) and cadmium lead niobate (CPN) are respective examples of a solid solution of ferroelectric materials which has a Curie temperature that is the interpolation of the Curie temperatures of the constituent materials. As is well known, the Curie temperature of a material is the temperature at which an applied electric field causes a considerable change in temperature. For purposes of the invention, the desired active temperature of the electrocaloric element is in the vicinity of the Curie temperature. Therefore, the desired active temperature may be achieved by varying the ratios of the barium and strontium constituents, and the cadmium and lead constituents. The BST "family" and the CPN "family" have Curie temperatures that are adjustable from room temperature to nearly 0° K.

Further discussion of the properties of BST is set forth in an article by H. Braeter, W. Windsch and V. L. Aksenov in *Ferroelectric Letters*, Vol. 3, 1965, page 97; and further discussion of the properties of CPN is set forth in *Ferroelectric Crystals*, F. Jona and G. Shirane, Macmillan, New York, 1962.

In the following discussion, the BST and CPB families will be identified as examples of materials which may be appropriately utilized for electrocaloric elements. Such examples will also include the appropriate working temperatures which are respectively achieved by appropriate constituent ratios.

The specific examples of ferroelectric materials are not intended to be limiting, and are representative of appropriate materials which may be utilized for electrocaloric elements in this invention. There are many other materials which exhibit the above described property of having a Curie temperature that is adjustable.

Figure 2:
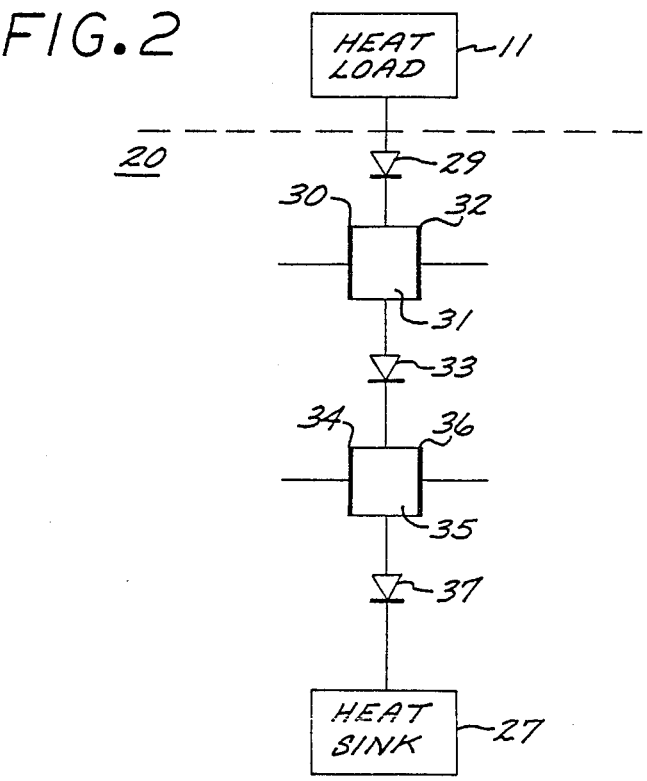

Referring now to FIG. 2, shown therein is a two stage electrocaloric cooling system 20 which utilizes two electrocaloric elements for cooling a heat load 11. The cooling system 20 specifically includes a unidirectional heat pipe 29 for thermally coupling the heat load 11 to an electrocaloric element 31. A pair of electrodes 30, 32 are disposed on opposite surfaces of the electrocaloric element 31, and are appropriately coupled to a source of an electric field generating voltage (not shown).

Another unidirectional heat pipe 33 thermally couples the electrocaloric element 31 to another electrocaloric element 35. A pair of electrodes 34, 36 are disposed on opposite surfaces of the electrocaloric element 35, and are appropriately coupled to a source of an electric field generating voltage (not shown). A unidirectional heat pipe 37 thermally couples the electrocaloric element 35 to a heat sink 27.

The unidirectional heat pipes 29, 33, 37 and the electrocaloric elements 31, 35 have appropriate working temperatures so that heat can be sequentially transferred from the heat load 11 to the electrocaloric element 31, and then to the electrocaloric element 35, and finally to the heat sink 27. More particularly, the working temperatures increase as the heat pipe or the electrocaloric element is further in the sequence from the heat load 11. Examples of materials and working temperature ranges are provided further below.

In operation, the electrodes 30, 32 of electrocaloric element 31 and the electrodes 34, 36 of the electrocaloric element 35 are alternately pulsed so that an electric field is applied to only one of the electrocaloric elements at any given time. Such alternate pulsing of the electrocaloric elements 31, 35 will provide for the sequential transfer of heat from the heat load 11 to the heat sink 27.

Specifically, an electric field is applied to the electrocaloric element 35 which will then heat to a temperature that is greater than the temperature of the heat sink 27. The unidirectional heat pipe 37 will therefore thermally conduct heat from the electrocaloric element 35 to the heat sink 27; and heat is thereby extracted from the electrocaloric element 35.

When the electric field is removed from the electrocaloric element 35, it cools to a temperature lower than that prior to application of the electric field. When the temperature of the electrocaloric element becomes less than the temperature of the heat sink 27, the unidirectional heat pipe 37 will switch off, thereby preventing reverse heat flow.

After removal of the electric field from the electrocaloric element 35, an electric field is subsequently applied to the electrocaloric element 31 which will heat up to a temperature that is greater than the temperature of the electrocaloric element 35. When the temperature of the electrocaloric element 31 exceeds the temperature of the electrocaloric element 35, the unidirectional heat pipe 33 will then become thermally conductive to conduct heat from the electrocaloric element 31 to the electrocaloric element 35. At this time, the unidirectional heat pipe 29 will be nonconductive since the temperature of the electrocaloric element 31 will be higher than that of the heat load 11.

The electric field is then removed from the electrocaloric element 31 which proceeds to cool to a temperature lower than the temperature it had prior to application of the electric field and also lower than the temperature of the electrocaloric element 35. The cooled temperature of the electrocaloric element 31 is also lower than the temperature of the heat load 11. When the temperature of the electrocaloric element 31 becomes lower than the temperature of the heat load 11, the unidirectional heat pipe 29 becomes conductive. Therefore, heat is transferred from the heat load 11 to the electrocaloric element 31. The unidirectional heat pipe 33 remains nonconductive so long as the temperature of the electrocaloric element 35 exceeds the temperature of the electrocaloric element 31.

The above-described sequence is then repeated beginning with the application of an electric field to the electrocaloric element 35.

The foregoing sequence of alternately pulsing the electrocaloric elements 31, 35 in sequence is continually repeated to achieve the desired cooling of the heat load 11.

The unidirectional heat pipes 29, 33, and 37 and the electrocaloric elements 31, 35 are implemented with appropriate materials to achieve the sequential transfer of heat from the heat load 11 to the heat sink 27. By way of example, the unidirectional heat pipe 29 may utilize oxygen ($O_2$) as a cryogenic working fluid for an operating temperature range 50° K.-120° K. The electrocaloric element 31 may be of an appropriate material such as barium strontium titanate $[(Ba_xSr_{1-x})TiO_3]$ or cadmium lead niobate $[(Cd_xPb_{1-x})Nb_2O_7]$ for an operating temperature range of 50° K.-200° K. The unidirectional heat pipe 33 may include ethene ($C_2H_6$) as a cryogenic working fluid for an operating temperature range of 100° K.-300° K. The electrocaloric element 35 may be of an appropriate material such as barium strontium titanate $[(Ba_xSr_{1-x})TiO_3]$ or cadmium lead niobate $[(Cd_xPb_{1-x})Nb_2O_7]$ for an operating temperature range of 150° K.-400° K. The unidirectional heat pipe 37 may include ammonia ($NH_3$) as a cryogenic working fluid for an operating temperature range of 200° K.-400° K.

The cooling system of FIG. 2 may be referenced as a two-stage system since it includes two transfer stages between the heat load 11 and the heat sink 27.

Referring now to FIG. 3, shown therein is a two-stage, three-element electrocaloric cooling system 30 for cooling a heat load 11 by sequentially transferring heat to a pair of heat sinks 27. The cooling system 30 includes a unidirectional heat pipe 39 for thermally coupling the heat load 11 to an electrocaloric element 41. A pair of electrodes 40, 42 are disposed on opposite surfaces of the electrocaloric element 41, and are appropriately coupled to a source of an electric field generating voltage (not shown).

Another unidirectional heat pipe 43 thermally couples the electrocaloric element 41 to an electrocaloric element 45. A pair of electrodes 44, 46 are disposed on opposite surfaces of the electrocaloric element 45, and are appropriately coupled to a source of an electric field generating voltage (not shown). The electrocaloric element 45 is coupled via a unidirectional heat pipe 47 to the heat sink 27.

The electrocaloric element 41 is further thermally coupled via a unidirectional heat pipe 49 to an electrocaloric element 51. A pair of electrodes 50, 52 are disposed on opposite surfaces of the electrocaloric element 51, and are appropriately coupled to a source of an electric field generating voltage (not shown). The electrocaloric element 51 is thermally coupled via a unidirectional heat pipe 53 to the heat sink 27.

The operation of the cooling system 30 of FIG. 3 is similar to the operation of the cooling system 20 of FIG. 2, with the electrocaloric elements 45, 51 being pulsed in phase (i.e., concurrently). The use of parallel electrocaloric elements 45, 51 that are pulsed in phase provides for increased thermal load pumping capacity.

The cooling system 30 is a two-stage system having two transfer stages where the second stage has two electrocaloric elements pulsed in parallel.

Referring now to FIG. 4, shown therein is a single stage, two-element cooling system 40 which includes two electrocaloric elements that are pulsed 180 degrees relative to each other. Specifically, the cooling system 40 includes a unidirectional heat pipe 55 which is thermally coupled between the heat load 11 and an electrocaloric element 57. A pair of electrodes 56, 58 are disposed on opposite surfaces of the electrocaloric element 57, and are appropriately coupled to a source of an electric field generating voltage (not shown). A unidirectional heat pipe 59 is thermally coupled between the electrocaloric element 57 and the heat sink 27.

The cooling system 40 further includes a unidirectional heat pipe 61 that is thermally coupled between the heat load 11 and an electrocaloric element 63. A pair of electrodes 62, 64 are disposed on opposite surfaces of the electrocaloric element 63, and are appropriately coupled to a source of an electric field generating voltage (not shown). A unidirectional heat pipe 65 is thermally coupled between the electrocaloric element 63 and the heat sink 27.

In operation, the electrocaloric elements 57, 63 are pulsed 180 degrees out-of-phase. That is, they are alternately pulsed so that one electrocaloric element is being heated while the other is cooling. The out of phase operation of the cooling system 40 allows for a lower cycling (pulsing) frequency.

The unidirectional heat pipes and electrocaloric elements of the cooling system 40 may be made of the same materials as the cooling system 10 of FIG. 1.

Figure 5:
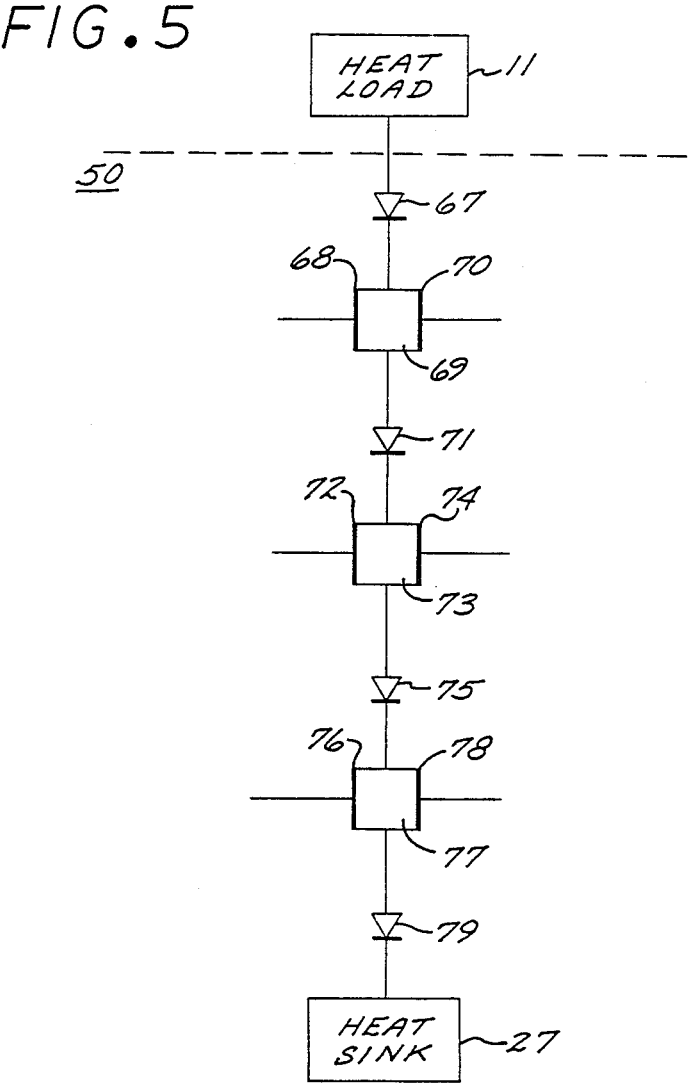

Referring now to FIG. 5, shown therein is a three stage electrocaloric cooling system 50 which utilizes three electrocaloric elements for cooling a heat load 11. The cooling system 50 specifically includes a unidirectional heat pipe 67 for thermally coupling the heat load 11 to an electrocaloric element 69. A pair of electrodes 68, 70 are disposed on opposite surfaces of the electrocaloric element 69, and are appropriately coupled to a source of an electric field generating voltage (not shown).

Another unidirectional heat pipe 71 thermally couples the electrocaloric element 69 to another electrocaloric element 73. A pair of electrodes 72, 74 are disposed on opposite surfaces of the electrocaloric element 73, and are appropriately coupled to a source of an electric field generating voltage (not shown).

A unidirectional heat pipe 75 thermally couples the electrocaloric element 73 to an electrocaloric element 77. A pair of electrodes 76, 78 are disposed on opposite surfaces of the electrocaloric element 77, and are appropriately coupled to a source of an electric field generating voltage (not shown). A unidirectional heat pipe 79 thermally couples the electrocaloric element 77 to a heat sink 27.

The unidirectional heat pipes 67, 71, 75, 79 and the electrocaloric elements 69, 73, 77 have appropriate working temperatures so that heat can be sequentially transferred from the heat load 11 to the electrocaloric element 69, then to the electrocaloric element 73, and then to the electrocaloric element 77, and finally to the heat sink 27. More particularly, the working temperatures increase as the heat pipe or the electrocaloric element is further in the sequence from the heat load 11. Examples of materials and working temperature ranges are provided further below.

In operation, the electrocaloric elements 69, 73, 77 are sequentially pulsed so that an electric field is applied to only one of the electrocaloric elements at any given time. Such sequential pulsing of the electrocaloric elements 69, 73, 77 provides for the sequential transfer of heat from the heat load 11 to the heat sink 27.

Specifically, an electric field is applied to the electrocaloric element 77 which will then heat to a temperature that is greater than the temperature of the heat sink 27. The unidirectional heat pipe 79 will therefore thermally conduct heat from the electrocaloric element 77 to the heat sink 27; and heat is thereby extracted from the electrocaloric element 77.

When the electric field is removed from the electrocaloric element 77, it cools to a temperature lower than that prior to application of the electric field. When the temperature of the electrocaloric element 77 becomes less than the temperature of the heat sink 27, the unidirectional heat pipe 79 becomes non-conductive, thereby preventing reverse heat flow.

After the electric field is removed from the electrocaloric element 77, an electric field is subsequently applied to the electrocaloric element 73 which will then heat to a temperature that is greater than the temperature of the electrocaloric element 77. When the temperature of the electrocaloric element 73 exceeds the temperature of the electrocaloric element 77, the unidirectional heat pipe 75 becomes conductive to thermally conduct heat from the electrocaloric element 73 to the electrocaloric element 77; and heat is thereby extracted from the electrocaloric element 73.

When the electric field is removed from the electrocaloric element 73, it cools to a temperature lower than that prior to application of the electric field. When the temperature of the electrocaloric element 73 becomes less than the temperature of the electrocaloric element 77, the unidirectional heat pipe 75 will switch off, thereby preventing reverse heat flow.

After the electric field is removed from the electrocaloric element 73, an electric field is subsequently applied to the electrocaloric element 69 which will heat up to a temperature that is greater than the temperature of the electrocaloric element 73. When the temperature of the electrocaloric element 69 exceeds the temperature of the electrocaloric element 73, the unidirectional heat pipe 71 will become thermally conductive to conduct heat from the electrocaloric element 69 to the electrocaloric element 73.

The electric field is then removed from the electrocaloric element 69 which then proceeds to cool to a temperature lower than the temperature it had prior to application of the electric field and also lower than the temperature of the electrocaloric element 73. The cooled temperature of the electrocaloric element 69 is also lower than the temperature of the heat load 11. When the temperature of the electrocaloric element 69 becomes less than the temperature of the electrocaloric element 73, the unidirectional heat pipe 71 becomes non-conductive. When the temperature of the electrocaloric element becomes less than the temperature of the heat load 11, the unidirectional heat pipe 67 becomes conductive. Therefore, heat is transferred from the heat load 11 to the electrocaloric element 69.

The above-described sequence is then continually repeated, beginning with the application of an electric field to the electrocaloric element 77, to achieve the desired cooling of the heat load 11.

The unidirectional heat pipes 67, 71, 75, 79 and the electrocaloric elements 69, 73, 77 are implemented with appropriate materials to achieve the sequential transfer of heat from the heat load 11 to the heat sink 27. By way of example, the unidirectional heat pipe 67 may utilize nitrogen ($N_2$) as a cryogenic working fluid for an operating temperature range of 65° K.-100° K. The electrocaloric element 69 may be of an appropriate material such as barium strontium titanate [$(Ba_xSr_{1-x})TiO_3$] or cadmium lead niobate [$(Cd_xPb_{1-x})Nb_2O_7$] for an operating temperature range of 60° K.-120° K. The unidirectional heat pipe 71 may include methane ($CH_4$) as a cryogenic working fluid for an operating temperature range 80° K.-200° K. The electrocaloric element 73 may be of an appropriate material such as barium strontium titanate [$(Ba_xSr_{1-x})TiO_3$] or cadmium lead niobate [$(Cd_xPb_{1-x})Nb_2O_7$] for an operating temperature range 100° K.-300° K. The unidirectional heat pipe 75 may include ethene ($C_2H_6$) as a cryogenic working fluid for an operating temperature range of 100° K.-300° K. The electrocaloric element 77 may be of an appropriate material such as barium strontium titanate [$(Ba_xSr_{1-x})TiO_3$] or cadmium lead niobate [$(Cd_xPb_{1-x})Nb_2O_7$] for an operating temperature range of 200° K.-400° K. The unidirectional heat pipe 37 may include ammonia ($NH_3$) as a cryogenic working fluid for an operating temperature range of 200° K.-400° K.

The foregoing has been a discussion of a solid-state, electrocaloric cooling system which has no mechanical parts, is very reliable, and is not complex. Further, the disclosed cooling system provides for the use of appropriate stages so that it may be utilized in different temperature ranges.

Although the foregoing has been a description and illustration of specific embodiments of the invention, various modifications and changes thereto can be made by persons skilled in the art without departing from the scope and spirit of the invention as defined by the following claims.

What is claimed is:

1. A cooling system for transferring heat, comprising:
   a first electrocaloric element selected from the group consisting of barium strontium titanate and cadmium lead niobate;
   a pair of electrodes disposed on opposite surfaces of said electrocaloric element;
   a first unidirectional heat pipe responsive to a heat source and thermally coupled to said electrocaloric element for conducting heat away from the heat source to said electrocaloric element when the heat source temperature exceeds the temperature of said electrocaloric element;
   a second unidirectional heat pipe thermally coupled to said electrocaloric element for transferring heat from said electrocaloric element when the temperature of said electrocaloric element exceeds a predetermined temperature;
   a second electrocaloric element selected from the group consisting of barium strontium titanate and cadmium lead niobate, said second electrocaloric element being thermally coupled to said second heat pipe;
   a second pair of electrodes disposed on opposite surfaces of said second electrocaloric element;
   a third unidirectional heat pipe thermally coupled to said second electrocaloric element for transferring heat from said second electrocaloric element when its temperature exceeds a predetermined temperature; and
   means for selectively applying voltages between electrodes of said electrode pairs for respectively generating electric fields in said first and second electrocaloric elements to heat said first and second electrocaloric elements in response to the presence of the electric fields and to cool said first and second electrocaloric elements upon removal of the electric fields, whereby said first and second electrocaloric elements functions as heat sinks to receive heat through said first and second heat pipes respectively when the temperatures of the heat source and said first electrocaloric element exceeds the temperature of said first and second electrocaloric elements, respectively.

2. A cooling system for tranferring heat, comprising:
   first, second, and third electrocaloric elements selected from the group consisting of barium strontium titanate and cadmium lead niobate, each having a pair of electrodes disposed on opposite surfaces thereof;
   a first unidirectional heat pipe responsive to a heat source and thermally coupled to said first electrocaloric element for conducting heat away from the heat source to said first electrocaloric element when the heat source temperature exceeds the temperature of said first electrocaloric element;
   second and third unidirectional heat pipes both thermally coupled to said first electrocaloric element for conducting heat away from said first electrocaloric element, said second and third unidirectional heat pipes further being respectively thermally coupled to said second and third electrocaloric elements;
   fourth and fifth unidirectional heat pipes respectively thermally coupled to said second and third electrocaloric elements for respectively transferring heat from said second and third electrocaloric elements when the respective temperatures of said second and third electrocaloric elements exceed respective predetermined temperatures; and
   means for selectively applying voltages between electrodes of said electrode pairs for respectively generating electric fields in said first, second and third electrocaloric elements to respectively heat said first, second and third electrocaloric elements and cool said first, second, and third electrocaloric elements upon removal of the electric field.

3. The cooling system of claim 2 wherein said second and third electrocaloric elements are responsive to electric fields that are applied in phase.

4. The cooling system of claim 3 wherein said first electrocaloric element is responsive to an electric field that is out of phase relative to the electric fields applied to said second and third electrocaloric elements.

* * * * *